United States Patent
Bui Van et al.

(10) Patent No.: US 9,947,976 B2
(45) Date of Patent: Apr. 17, 2018

(54) SYSTEM AND METHOD FOR REGULATING THE TEMPERATURE OF AN ELECTROCHEMICAL BATTERY

(71) Applicant: RENAULT s.a.s., Boulogne-Billancourt (FR)

(72) Inventors: Anh Linh Bui Van, Saint Nizier du Moucherotte (FR); Ali Ercan, Guyancourt (FR); Pierre Perichon, Voiron (FR); Sylvain Lallich, Lans en Vercors (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 123 days.

(21) Appl. No.: 14/899,702

(22) PCT Filed: Jun. 13, 2014

(86) PCT No.: PCT/FR2014/051458
§ 371 (c)(1),
(2) Date: Dec. 18, 2015

(87) PCT Pub. No.: WO2014/202880
PCT Pub. Date: Dec. 24, 2014

(65) Prior Publication Data
US 2016/0141734 A1    May 19, 2016

(30) Foreign Application Priority Data

Jun. 18, 2013 (FR) ...................................... 13 55719

(51) Int. Cl.
*H01M 2/00* (2006.01)
*H01M 10/637* (2014.01)
(Continued)

(52) U.S. Cl.
CPC ........... *H01M 10/637* (2015.04); *H01M 2/34* (2013.01); *H01M 2/348* (2013.01);
(Continued)

(58) Field of Classification Search
CPC ............... H01M 2/34; H01M 10/0525; H01M 10/4207; H01M 2200/10; H01M 10/615;
(Continued)

(56) References Cited

U.S. PATENT DOCUMENTS

| 8,350,526 B2 * | 1/2013 | Dyer | ....................... B60L 1/003 |
| | | | 320/104 |
| 2005/0017690 A1 | 1/2005 | Kamenoff | |

(Continued)

FOREIGN PATENT DOCUMENTS

| WO | 2011 127251 | 10/2011 |
| WO | 2012 117113 | 9/2012 |
| WO | 2012 172035 | 12/2012 |

OTHER PUBLICATIONS

International Search Report dated Jul. 23, 2014 in PCT/FR14/051458 Filed Jun. 13, 2014.
(Continued)

*Primary Examiner* — Mark F. Huff
*Assistant Examiner* — Monique M Wills
(74) *Attorney, Agent, or Firm* — Oblon, McClelland, Maier & Neustadt, L.L.P.

(57) ABSTRACT

A system and method regulate the temperature of an electrochemical battery. The system can be incorporated in a hybrid or electric motor vehicle including at least two electrical-energy-accumulating elements, each element including at least one electrochemical cell. The system increases the intensity of the value of the current flowing through the battery up to a first threshold value and includes
(Continued)

a module for disconnecting and connecting an electrical-energy-accumulating element.

9 Claims, 2 Drawing Sheets

(51) Int. Cl.
*H01M 2/34* (2006.01)
*H01M 10/0525* (2010.01)
*H01M 10/42* (2006.01)
*H01M 10/625* (2014.01)
*H01M 10/617* (2014.01)
*H01M 10/615* (2014.01)

(52) U.S. Cl.
CPC ... *H01M 10/0525* (2013.01); *H01M 10/4207* (2013.01); *H01M 10/617* (2015.04); *H01M 10/625* (2015.04); *H01M 10/615* (2015.04); *H01M 2200/10* (2013.01); *H01M 2220/20* (2013.01); *Y02E 60/122* (2013.01); *Y02T 10/7011* (2013.01)

(58) Field of Classification Search
CPC .. H01M 10/637; H01M 10/617; H01M 2/348; H01M 2220/20; Y02E 60/122; Y02T 10/7011
See application file for complete search history.

(56) References Cited

U.S. PATENT DOCUMENTS

2010/0261048 A1   10/2010   Kim et al.
2012/0176082 A1*  7/2012    Lee .................... B60L 1/02
                                                 320/103

OTHER PUBLICATIONS

French Search Report dated Feb. 19, 2014 in Application No. FR 1355719 Filed Jun. 18, 2013.

* cited by examiner

SYSTEM AND METHOD FOR REGULATING THE TEMPERATURE OF AN ELECTROCHEMICAL BATTERY

The present invention relates to the field of systems connected to an electrochemical battery, such as, for example, aircraft, land vehicles (truck, bus, two-wheeled vehicles, etc.) or maritime vehicles or stationary battery banks. In particular, the invention relates to the field of vehicles having a hybrid or electric power train. A hybrid vehicle includes at least two motors (or similar machines), at least one of which is electric. In particular, the invention relates to the field of electrochemical batteries used in such vehicles.

More particularly, the invention relates to systems enabling the temperature of the electrochemical batteries supplying the electric motor with current to be regulated.

In existing conventional systems, the electric motor of a vehicle having a hybrid or electric power train is coupled to an electrical energy storage device in the form of an electrochemical battery, for example a lead oxide-sulfuric acid, nickel hydride or lithium-ion battery.

An electrochemical battery of the electric motor of a vehicle having a hybrid or electric power train generally consists of a group of electrical-energy-accumulating elements connected in series and each including at least one electrochemical cell. Although the electric voltage on the terminals of an electrochemical cell is relatively low (in the region of 4 V for a Li-ion cell), the voltage on the terminals of the batteries is generally several hundred volts. A battery of this type is thus referred to as a high-voltage battery, but it has the disadvantage of having an internal resistance that is relatively high, but above all highly sensitive to the temperature of the accumulator.

It is known that the useful capacity and power of a battery of this type are maximum for a certain temperature range, typically between 15° C. and 45° C. for Li-ion cells. Outside this range, notably when the temperature of the accumulator is below 0° C., the capacity and power of the battery may be insufficient to guarantee the nominal operation of the vehicle in electric mode. Furthermore, it is difficult to discharge or recharge the battery completely at low temperature. Beyond 45° C., the use of the battery is generally deliberately limited in order to avoid damaging it.

In fact, some types of electric battery, such as batteries comprising lithium-iron electrochemical cells, are particularly adversely affected by very cold temperatures, insofar as their internal resistances increase with a reduction in temperature in such a way that they may no longer be capable of guaranteeing the electric supply of the electric motor or of being recharged when the temperature is below 0° C.

To avoid overstressing the electrochemical core of such cells or aggravating the degradation of the electrolyte and the increase in parasitic reactions, it is necessary to limit the value of the intensity of the current flowing through them when the temperature is below 0° C. or above 45° C.

It is sometimes possible to overdimension the battery cells in order to avoid these disadvantages, but this causes a considerable increase in cost and size.

Consequently, in vehicles equipped with such batteries, it is generally necessary to provide a system for reheating the electrochemical cells that make up said battery in the case of a low external temperature, or for cooling in the case of overheating of the energy-accumulating elements.

Furthermore, the energy-accumulating elements being connected in series in order to maximize the battery output voltage and reduce the current intensity value and the dimensioning of the cabling, when a single element has a temperature which differs from that of the other elements, the group of energy-accumulating elements will be subject to a power limitation since the same current intensity flows through each of the energy-accumulating elements. Thus, a single element having a different temperature in a battery imposes its limitations on the battery as a whole.

Furthermore, these heterogeneous properties are accentuated when the battery is no longer a homogeneous block of energy-accumulating elements, but has complex shapes, for example a "T" shape, or is made up of a group of energy-accumulating elements distributed at various locations in the vehicle.

Systems are already known for heating and cooling a battery pack, including a heating device outside the battery or inside the battery around the accumulating elements, including an air or water cooling circuit allowing the electric battery to be cooled or heated, notably using a means for heating the coolant flowing in the cooling circuit, such as positive temperature coefficient ("PTC") resistors. These resistors may be integrated directly into the circuit of air that is intended to be blown over the battery.

However, a solution of this type is not optimized in terms of cost and size and may be intrusive upon the overall cooling system of the vehicle.

Furthermore, a solution of this type is used for the thermal conditioning of the battery as a whole, yet the distribution of the coolant and the changes in its properties (notably temperature) may result in temperature disparities between the cells. In fact, substantial temperature differences may exist between different areas of the battery, for example in the region of 20° C. The first cells in contact with the cooling circuit are cooled or heated in a sufficient manner. Those located at the end of the cooling circuit receive air that is already heated or cooled by the previously encountered cells, so that the cells are then cooled or are heated much less. This causes a limitation in performance, a premature ageing or degradation of the cells which are the least well heated or cooled, and results in an inhomogeneity in the battery. This inhomogeneity reduces the useful energy since the cell having the lowest charge voltage imposes its charge level on the other cells and thus reduces the energy potential of the battery as a whole.

Reference can also be made to document US 2012021397 which describes a system for heating the battery by causing a current to flow in the battery in order to heat the cells by means of their internal resistors.

However, a system of this type allows all of the cells of the battery to be heated in a uniform manner in such a way that when temperature differences exist between the elements, the temperature disparities between the different cells of the same battery pack persist.

The object of the present invention is therefore to overcome these disadvantages.

More particularly, the present invention aims to provide the regulation of the temperature inside the accumulating elements of the battery in order to obtain a similar temperature in each electrochemical cell.

Another object of the invention is to heat the electrochemical cells of a battery directly via the inside of the battery.

The object of the invention is also to homogenize the ageing of the elements that make up the pack in order to obtain a pack that lasts longer and thus reduce the replacements of the batteries at 'end of life'.

The subject-matter of the invention is a system for regulating the temperature of an electrochemical battery, notably of a hybrid or electric motor vehicle, including at least two electrical-energy-accumulating elements, each comprising at least one electrochemical cell.

The temperature-regulating system includes means for increasing the intensity of the value of the current flowing through the battery up to a first threshold value. A determined part of the battery is thus heated. It is also possible to regulate the temperature of the battery in order to minimize the temperature disparities between the cells.

The means for increasing the current intensity value include a module for disconnecting and connecting an electrical-energy-accumulating element. This allows the accumulating elements that remain connected to heat up more quickly and those that are disconnected to cool down more quickly or to heat up less than the other energy-accumulating elements.

The regulating system advantageously includes a module for determining the electrical-energy-accumulating element(s) to be disconnected or connected as a function of the temperature of each accumulating element measured by a measurement means.

In one embodiment, the disconnection and connection module includes means for switching the flow of the current in the different electrical-energy-accumulating elements. The temperature within the battery is thus homogenized and the temperature disparities between each energy-regulating element disappear.

The electrochemical cells are, for example, lithium-iron cells.

In one embodiment, the electric battery includes N electrical-energy-accumulating elements and the disconnection and connection module is capable of disconnecting or connecting N−1 energy-accumulating elements.

According to a second aspect, the invention relates to a method for regulating the temperature of an electric battery of a motor vehicle having a hybrid or electric power train, including at least two electrical-energy-accumulating elements, each comprising at least one electrochemical cell, in which the value of the intensity of the current flowing through the battery is increased up to a first threshold value by disconnecting or connecting at least one of the electrical-energy-accumulating elements.

The electrical-energy-accumulating element to be disconnected is advantageously determined as a function of its temperature and/or its location in the battery and/or its state of health ("SOH").

One advantage of regulating the temperature is to be able, in some cases, to increase the exchange powers (=performance criteria) contributing to ageing.

In one embodiment, the electrical-energy-accumulating element to be disconnected is determined as a function of the power required by the user. Thus, at cold temperature, when the required power is low, the coldest accumulating elements are connected in order to heat them up, and when the required power is high, the hottest accumulating elements are connected in order to avoid limiting the current. The hot accumulating elements will heat up even more quickly, thus accentuating the imbalance but allowing the user to drive.

According to one embodiment, the temperature of the electrical-energy-accumulating elements is homogenized by switching the flow of the current in the different electrical-energy-accumulating elements. All of the elements of the battery are thus heated successively.

Finally, according to a different embodiment, in order to homogenize the temperature of the battery, the coldest elements can be heated by disconnecting the other elements (the current is then increased at constant power in the coldest elements, thereby contributing to their heating), and/or the hottest elements can be heated less by disconnecting them (the current which flows through the electrochemical cells of the disconnected elements is then zero, as a result of which they heat up less, or even cool down).

Other objects, characteristics and advantages of the invention will become evident from a reading of the following description, given purely as a non-limiting example, with reference to the attached drawings, in which.

Figure 1:
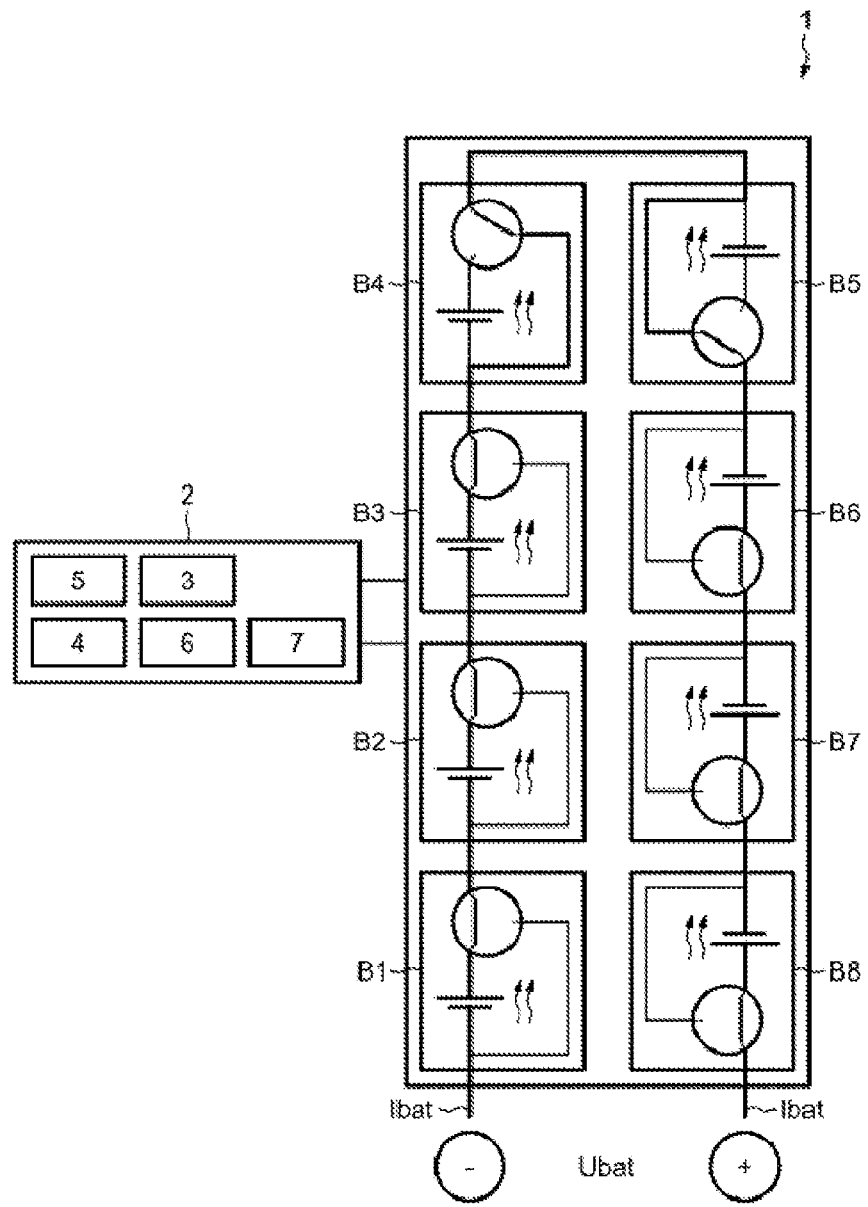
FIG. 1 shows schematically a battery-regulating system according to the invention.

With reference to FIG. 1, an electrical storage device in the form of an electrochemical battery 1 includes a plurality of electrical-energy-accumulating elements $B_i$, i being the number of accumulating elements between 1 and N, enabling the production of electrical energy for the motorization of a vehicle having electric or hybrid traction or propulsion (not shown).

Each electrical-energy-accumulating element $B_i$ comprises at least one electrochemical cell, for example a lithium-iron cell.

Here, the battery 1 comprises eight electrical-energy-accumulating elements $B_i$, i being between 1 and 8. It will be noted that the battery 1 could include a number greater than or equal to two of electrical-energy-accumulating elements $B_i$. The energy-accumulating elements $B_1$ to $B_8$ are disposed in series. The current Ibat is the current flowing through the accumulating elements.

The system for regulating the temperature of the battery, denoted 2 in its entirety, includes a measurement module 3 receiving:

the data of the battery 1 and of each element originating from either measurement means such as temperature sensors (not shown) of each element Ti, or a processing module specific to each element, such as, for example, the calculation of the voltage of each element $U_{i, i=1 \text{ to } 8}$, on the basis of voltage measurements of each cell in series inside the corresponding element.

The regulating system 2 includes a module 4 for comparing the data retrieved by the measurement module 3 with threshold values Si, a module 5 for determining the electrical-energy-accumulating elements $B_i$ to be connected or disconnected, and a module 6 for disconnecting and connecting the electrical-energy-accumulating elements $B_i$.

The module 5 for determining the energy-accumulating elements $B_i$ to be disconnected or connected takes account of the data of the measurement module 3 and of the comparison module 4. The determination module 5 also communicates with the supervisor S (not shown in FIG. 1) of the vehicle in order to determine the accumulating elements to be disconnected or connected as a function, for example, of the operating mode of the vehicle, if it is in drive mode or possibly in battery-charging mode.

Thus, when the temperature Tbat of the battery 1 is less than a threshold value $S_{Tbat}$, for example 0° C., the system 2 for regulating the temperature Tbat will determine the energy-accumulating elements $B_i$ to be disconnected as a function of the temperature $T_i$ in each of the energy-accumulating elements $B_i$. The mean temperature mean(Ti) of the elements $B_i$ can be taken for Tbat, or, in order to take account of the extreme temperature values, Tbat_min, corresponding to the minimum of the temperatures min(Ti) of the elements $B_i$, can be taken for the cold temperatures.

In order to quickly heat up the battery 1 or at least a part of the battery, the energy-accumulating elements $B_i$ having a very low temperature $T_i$ will be disconnected. The current Ibat flowing through the other non-disconnected energy-accumulating elements $B_i$ is then increased and the heat losses generated by the internal resistors of the cells of each connected energy-accumulating element enable heating more quickly at the core.

As shown in FIG. 1, the current Ibat flows through the energy-accumulating elements $B_1$, $B_2$, $B_3$, $B_6$, $B_7$, $B_8$ and the energy-accumulating elements $B_4$, $B_5$ are disconnected. The intensity of the current Ibat of the battery 1 is thus increased for the same power Pbat. The cells of the energy-accumulating elements $B_1$, $B_2$, $B_3$, $B_6$, $B_7$, $B_8$ through which a greater current intensity Ibat flows heat up more quickly via the heat losses generated by their internal resistors.

Alternatively, the energy-accumulating elements $B_i$ having a very low temperature $T_i$ could be connected and the energy-accumulating elements $B_i$ having a higher temperature Ti could be disconnected in order to reduce the voltage Ubat and increase the current Ibat, thus allowing the energy-accumulating elements $B_i$ to heat up more quickly.

The temperature-regulating system 2 includes a switching module 7 integrated into the connection and disconnection module 6 and communicating with the determination module 5, enabling the switching of the flow of the current Ibat in the different electrical-energy-accumulating elements $B_i$ in order to interchange the energy-accumulating elements $B_i$ regularly in such a way that the whole of the battery 1 is heated up in a homogeneous manner and the temperature disparities between each element disappear.

Alternatively, a conventional heating system (not shown) could be provided. In this case, the electrical-energy-accumulating elements located downstream of the heating system are disconnected since they will heat up more quickly. The other energy-accumulating elements will heat up via the current flowing through their internal resistors.

Figure 2:
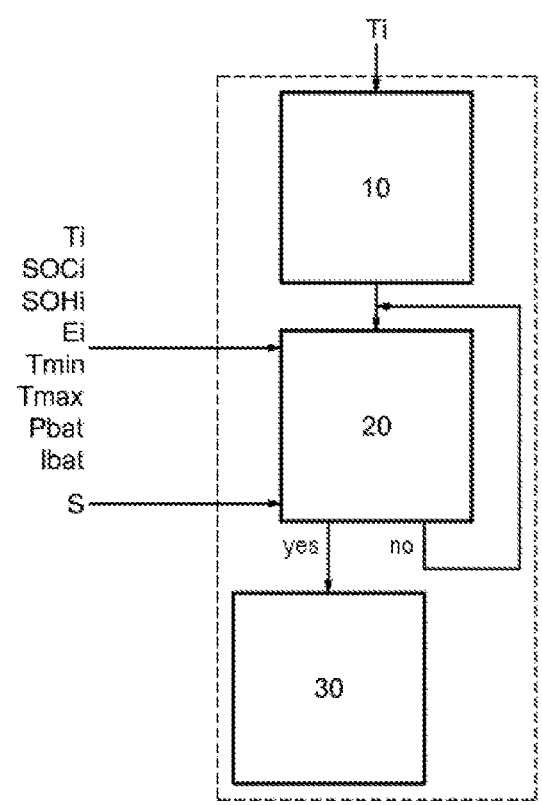
FIG. 2 shows an embodiment of the method according to the invention.

FIG. 2 shows a method for regulating the temperature Tbat of the battery 1, including a step 10 of analyzing the temperatures $T_{i,i=1\ to\ N}$ measured in each of the elements $B_i$ of the battery 1 and comparing them with a temperature threshold value $S_{Tbat}$ and a step 20 of determining a configuration improving the thermal conditioning of the battery, i.e. how many and which of the accumulating elements $B_i$ are to be disconnected. The step 20 also determines whether the chosen configuration can be applied as a function of the data of the battery 1 and of each element, notably as a function of the intensity of the current Ibat flowing through the battery 1, the voltage Ubat delivered by the battery, the power Pbat delivered by the battery 1, the state of charge SOCi of each accumulating element, the initial state Ei of each accumulating element, whether it is disconnected or not, minimum and maximum temperatures Tmin, Tmax of the cells in each accumulating element and also information originating from the supervisor S of the vehicle.

In step 20, it is checked that the value of the intensity of the current Ibat flowing through the battery 1 is less than a threshold value $S_{Ibat}$ in order not to degrade the electrochemical cells. It will be noted that the threshold value $S_{Ibat}$ is not a constant value and may originate, for example, from a mapping S=f(SOC, T), a function of the state of charge SOC and the temperature T. Thus, for a connected element, the maximum current passing through the cells of the element is a function of SOCi and Ti. The accumulating elements being connected in series, it is the same Ibat that flows through all the cells of all the connected elements. The value of the intensity Ibat must therefore be less than the maximum current of each element.

It is checked that the voltage Ubat on the terminals of the battery 1 is greater than a threshold value $S_{Ubat}$ in order not to drop below a low voltage limit of, for example, 240 V.

It is checked that the power Pbat delivered by the battery 1 is greater than a threshold value $S_{Pbat}$ in order to supply a sufficient electric power to the electric motor and possibly to the other devices supplied with electrical energy by the battery.

The regulating method includes a step 30 of applying the chosen configuration when the application conditions have been checked and approved in step 20.

Initially, when the temperature Tbat of the battery 1 is less than the temperature threshold value $S_{Tbat}$, the coldest electrical-energy-accumulating elements $B_i$ are disconnected in step 30 so that they do not impose their limitations on the other energy accumulating elements. A current having an intensity Ibat greater than for a standard battery 1 then flows through the other energy accumulating elements which are heated via the heat losses generated by the flow of the current through the internal resistor of their cells.

The value of the intensity of the battery 1 is thus increased up to a first threshold value $S_{Ibat}$.

Once some of the energy-accumulating elements $B_i$ are heated, the temperatures $T_{i,i=1\ to\ N}$ measured in each of the elements are compared and the flow of the current Ibat in the energy-accumulating elements $B_i$ is switched this time in order to disconnect the hottest energy-accumulating elements in order to homogenize the temperature Tbat inside the battery 1.

The energy-accumulating elements $B_i$ can also be disconnected according to their location in the battery 1 and their state of health $SOH_i$.

Alternatively, a conventional heating system could also be used. In this case, the energy-accumulating elements located downstream of the heating system are disconnected in order not to be heated at the same time by the losses generated by the flow of the current in the internal resistors and the conventional heating system. The other energy-accumulating elements will heat up via the current flowing through their internal resistors.

By means of the invention that has just been described, the heating of the battery is based on the use of the internal resistor of the cells, the heat source that is used therefore being located on the actual inside of the battery, thus improving the efficiency of the heating. In fact, the internal resistor of the cells increases very strongly when the temperature reduces. The heat losses of the cells are very substantial and are used to heat the cells.

The ageing of the cells of a battery is thus reduced by improving the homogeneity of the temperature of the cells. This homogeneity is ensured by the means for determining the energy-accumulating elements to be disconnected and the means for switching the flow of the current in the different electrical-energy-accumulating elements of the battery as a function of the temperature of each electrical-energy-accumulating element, their location in the vehicle and the state of charge of the battery.

The invention claimed is:
1. A system for regulating temperature of an electrochemical battery of a hybrid or electric motor vehicle, including at least two electrical-energy-accumulating ele- ments, each of the at least two electrical-energy-accumulating elements comprising at least one electrochemical cell, the system comprising:
  circuitry configured to
    determine individual temperature measurements of each of the at least two electrical-energy-accumulating elements, and
    selectively set a connection or disconnection state of each of the at least two electrical-energy-accumulating elements to regulate the temperature of the electrochemical battery based on the determined individual temperature measurements of the at least two electrical-energy-accumulating elements,
    wherein the circuitry is configured to selectively disconnect at least one of the at least two electrical-energy-accumulating elements to increase a value of an intensity of a current flowing through all connected ones of the at least two electrical-energy-accumulating elements up to a first threshold value.

2. The regulating system as claimed in claim 1, wherein the circuitry is configured to determine the electrical-energy-accumulating element(s) to be disconnected or connected as a function of the determined temperature of the electrical-energy-accumulating elements measured by a measurement means.

3. The regulating system as claimed in claim 1, wherein the circuitry is configured to selectively set the connection or disconnection state by switching on and switching off the flow of the current in the electrical-energy-accumulating elements.

4. The regulating system as claimed in claim 1, wherein the electrochemical cells are lithium-iron cells.

5. The regulating system as claimed in claim 1, wherein the electrochemical battery includes N electrical-energy-accumulating elements, and the circuitry is configured to selectively set the connection or disconnection state of N−1 energy-accumulating elements.

6. A method for regulating temperature of an electrochemical battery of a motor vehicle having a hybrid or electric power train, including at least two electrical-energy-accumulating elements, each of the at least two electrical-energy-accumulating elements comprising at least one electrochemical cell, the method comprising:
  determining individual temperature measurements of each of the at least two electrical-energy-accumulating elements; and
  selectively setting a connection or disconnection state of each of the at least two electrical-energy-accumulating elements to regulate the temperature of the electrochemical battery based on the determined individual temperature measurements of the at least two electrical-energy-accumulating elements,
  wherein said selectively setting the connection or disconnection state includes disconnecting at least one of the at least two electrical-energy-accumulating elements to increase a value of an intensity of a current flowing through all connected ones of the at least two electrical-energy-accumulating elements up to a first threshold value.

7. The temperature-regulating method as claimed in claim 6, wherein each said electrical-energy-accumulating element to be disconnected is determined as a function of a temperature and/or a location in the electrochemical battery and/or a state of health of the electrical-energy-accumulating element.

8. The temperature-regulating method as claimed in claim 7, wherein the electrical-energy-accumulating element to be disconnected is determined as the function of power required by a user.

9. The temperature-regulating method as claimed in claim 7, wherein the temperature of the electrical-energy-accumulating element is homogenized relative to the other electrical-energy-accumulating elements by switching a flow of the current in the different electrical-energy-accumulating elements.

* * * * *